(12) United States Patent
Führer et al.

(10) Patent No.: US 6,658,955 B1
(45) Date of Patent: Dec. 9, 2003

(54) GEARWHEEL BEARING IN GEARBOXES

(75) Inventors: Gerhard Führer, Friedrichshafen (DE); Hermann Lanz, Frickingen (DE); Roland Stauber, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 119 days.

(21) Appl. No.: 10/009,580

(22) PCT Filed: Jun. 8, 2000

(86) PCT No.: PCT/EP00/05283
§ 371 (c)(1),
(2), (4) Date: Oct. 30, 2001

(87) PCT Pub. No.: WO00/77424
PCT Pub. Date: Dec. 21, 2000

(30) Foreign Application Priority Data

Jun. 15, 1999 (DE) .......................... 199 27 080

(51) Int. Cl.$^7$ ................................ F16H 3/38
(52) U.S. Cl. .................. 74/413; 74/414; 74/421 R
(58) Field of Search ................. 74/413, 414, 421 R

(56) References Cited

U.S. PATENT DOCUMENTS

| | | | |
|---|---|---|---|
| 2,753,728 A | * 7/1956 | Kelbel | 74/359 |
| 3,048,247 A | * 8/1962 | Cook et al. | 192/53.32 |
| 3,910,131 A | * 10/1975 | Richards | 74/331 |
| 4,458,546 A | * 7/1984 | Schreiner et al. | 74/410 |
| 4,624,352 A | * 11/1986 | Yarnell | 192/53.332 |
| 5,542,311 A | 8/1996 | Deeg | 74/410 |
| 5,546,823 A | 8/1996 | Stine et al. | 74/331 |
| 5,642,643 A | 7/1997 | Reynolds et al. | 74/331 |
| 5,921,137 A | * 7/1999 | Buri et al. | 74/339 |

FOREIGN PATENT DOCUMENTS

| | | | |
|---|---|---|---|
| DE | 196 33 279 A1 | 2/1998 | F16H/1/22 |
| DE | 196 33 282 A1 | 2/1998 | F16H/1/22 |
| EP | 0 233 480 B1 | 8/1987 | F16H/3/08 |
| EP | 0 628 749 A1 | 12/1994 | F16H/3/095 |
| EP | 0 636 813 A1 | 2/1995 | F16H/1/22 |
| EP | 0 683 873 B1 | 11/1995 | F16H/3/095 |

* cited by examiner

*Primary Examiner*—Marcus Charles
*Assistant Examiner*—Julie K. Smith
(74) *Attorney, Agent, or Firm*—Davis & Bujold, PLLC

(57) ABSTRACT

In the case of a vehicle transmission (2) with two counter shafts placed in a transmission housing (8) for the distribution of load, with one input shaft (4) and one main shaft (20) coaxially aligned with the input shaft (4), a gear (24) is placed in the area between the input shaft (4) and the main shaft (20). The gear (24) is secured by a bearing (26, 28) between the input shaft (4) and the main shaft (20) and secured radially by bearings between the two counter shafts. The bearing (26, 28) constitutes the exclusive axial bearing between the input shaft (4) and output shaft (20). The axial bearing comprises two axial effective roller bearings (26, 28) which lie on opposed sides of a projection (30) of the gear (24).

5 Claims, 1 Drawing Sheet

GEARWHEEL BEARING IN GEARBOXES

FIELD OF THE INVENTION

The invention concerns the bearings for a gear in a vehicle transmission.

BACKGROUND OF THE INVENTION

Modern, heavy duty vehicle transmissions predominately exhibit a main transmission gear grouping with a multistage, basic gear train and an integrated, forward placed split group and a subsequent auxiliary drive grouping. These predominately possess, in a transmission housing, a first shaft, termed an input shaft, and a centrally placed second shaft, hereinafter known as a main shaft, as well as one or more counter shafts. The input shaft and the main shaft, in this arrangement, are concentric.

SUMMARY OF THE INVENTION

The existing problem solution in accord with the state of the technology, calls for gears being placed in the area between the input shaft of a transmission and the main shaft and radially supported by bearings either on the input shaft or on the main shaft. Contrary to this, in accord with the invention, the proposal is that, in the case of a vehicle transmission having two countershafts placed in its housing for the purpose of load apportionment, wherein one input shaft and one main shaft are arranged coaxially to the input shaft, and with a gear in the zone between the input shaft and the main shaft, the said gear is to be supported axially by a bearing between the input and main shafts and supported radially, by a bearing exclusively between gears of the two counter shafts.

In an advantageous embodiment of the present invention, the bearing system presents exclusively an axial bearing between the input shaft and the main shaft. In a further advantageous embodiment, the axial bearing comprises two axially acting roller bearings which lie on both sides of a projection of the gear. Yet a further advantageous formulation shows the gear as provided for the reception of the axial forces resulting from the toothing of the main shaft and for conducting the axial forces to the input shaft and to the housing.

Because of the invented arrangement, only two bearings are now necessary instead of the previous three axial bearings. In relation to the design of the teeth and the collective load, the demands on the bearings will change and therewith, also their operational life. If the expected wear on the bearings becomes less, then recourse may be made to the designing of smaller sized bearings.

By means of the removal of the radial bearing of the gear on the main shaft, it is no longer necessary to so dimension this so that it extends axially into the zone between the input shaft and the main shaft. By this means, a savings in material in the area of the main shaft can be undertaken.

BRIEF DESCRIPTION OF THE DRAWING

The invention will, in the following, be more closely described with the aid of the drawing.

DETAILED DESCRIPTION OF THE INVENTION

Figure 1:
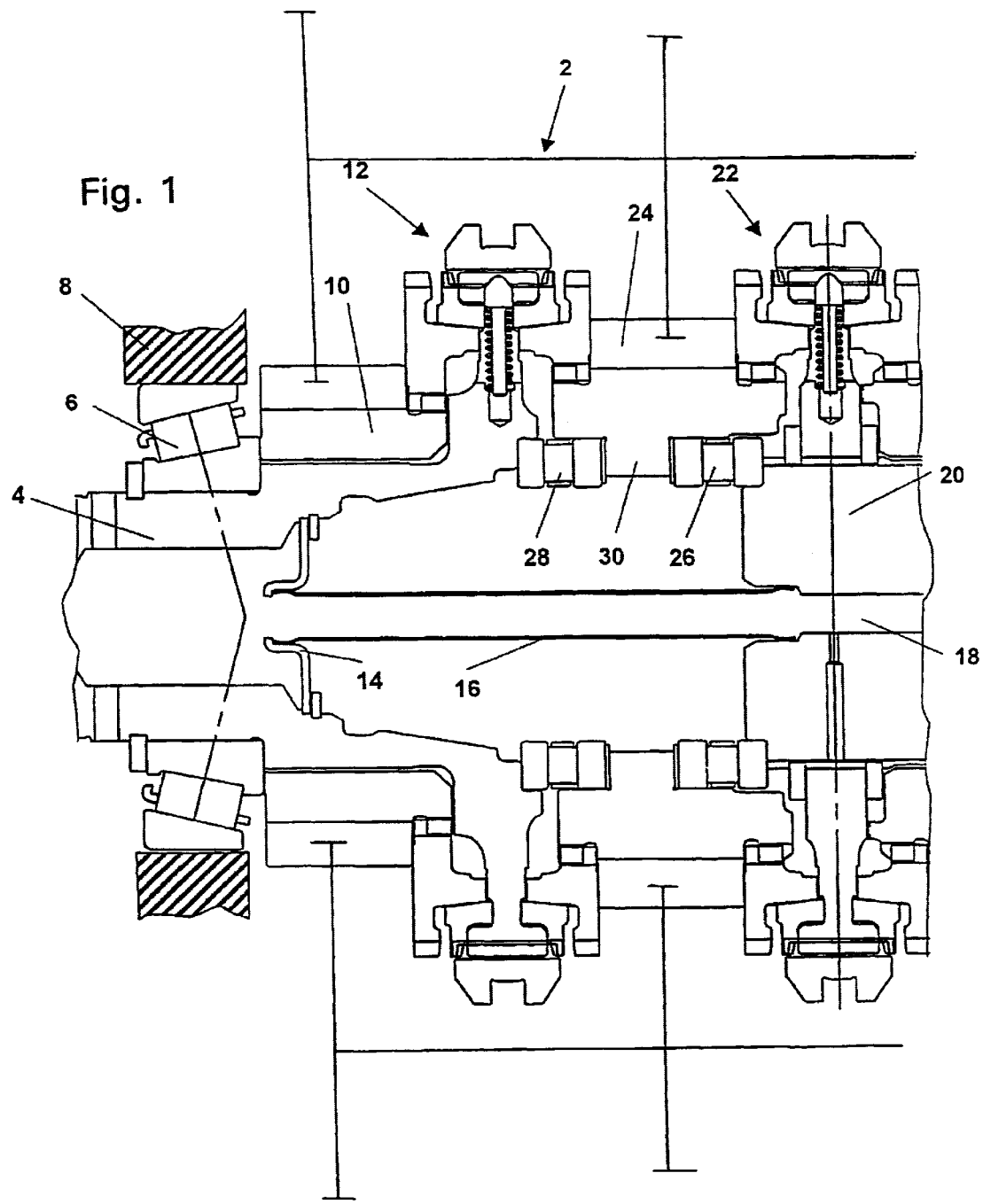

The single figure shows a section of a vehicle transmission 2, having an input shaft 4, which is seated in a transmission housing 8 by bearing 6. On the input shaft 4 is the gear 10 of the first constant rotatably supported in bearings, and by means of the synchronizer apparatus 10, can be non-rotatably affixed to the input shaft 4. A disk 14 is provided radially within the input shaft 4 from which extends a tube 16 for lubrication supply to an opening 18 within a main shaft 20 of the transmission 2. A synchronizing apparatus 22 is placed on the main shaft 20, with which the gear 24 can bind with the main shaft the second constant in a non-rotatable manner. The gear 24 is provided freely rotatable between the input shaft 4 and the main shaft 20, where it is supported on two axially effective roller bearings 26 and 28.

The axial forces generated by helical toothing of the gears (not shown) which are on the main shaft, are first transferred from the main shaft 20 to the roller bearing 26 and to the projection 30 on the gear 24. The roller bearing 28 then transfers the axial forces to the input shaft 4 and, by means of the bearings 6, further to the transmission housing 8.

By means of the synchronization apparatus 12, the gear 24, for the formation of the second constant can be non-rotatingly affixed to the input shaft 4. A direct torque connection between the input shaft 4 and the main shaft 20 for the formation of a direct drive, is likewise effected by means of the gear 24. For that purpose, the synchronizer apparatus 12 is so shifted, here in the plane of the drawing, to the right so that the input shaft 4 is non-rotationally affixed to the gear 24. Additionally, the synchronization apparatus 22 is so displaced, here in the plane of the drawing, to the left so that the main shaft 20 likewise is non-rotatingly affixed to the gear 24.

The invention concerns the bearings for a gear in a vehicle transmission in accord with the generic concept of claim 1.

Modern, heavy duty vehicle transmissions predominately exhibit a main transmission gear grouping with a multistage, basic gear train and an integrated, forward placed split group and a subsequent auxiliary drive grouping. These predominately possess, in a transmission housing, a first shaft, termed an input shaft, and a centrally placed second shaft, hereinafter known as a main shaft, as well as one or more counter shafts. The input shaft and the main shaft, in this arrangement, are concentric.

Giving consideration to running characteristics and smooth functioning, such transmissions can be designed with helically cut gearing, at least for the forward travel direction. The axial forces from such helical gearing must be picked up by axial gears and transferred to the housing.

Transmissions of the described mode of construction can be equipped with a countershaft or with a plurality of countershafts.

In the case of transmissions with load distribution to two counter shafts, the principal transmission group possesses two shafts, placed essentially behind one another, of which one shaft, which is either the input shaft or the main shaft of the main drive, is securely set in radial and axial bearings, while the respective other shaft floats. This is because of a necessary load compensation, and the shaft is set in radial movable bearings. In this arrangement, a point of caution is that a light radial swinging motion of the floating shaft is possible.

In the case of transmissions with two counter shafts, the load balance is so set up that the input shaft and the auxiliary drives are respectively carried by bearings rigidly affixed to the housing while the main shaft is finds floating support by those gears, which are in the path of transferred forces. In the case of transmissions without load distribution, then both shafts, i.e. input and output, are in radial and axial bearings to the transmission housing, whereby the one shaft is placed in a bearing within the other central shaft.

The known transmissions with staged gear changes for commercial vehicles possess a three or four staged main gear drive component and one split gear drive, before the main gear drive, as an auxiliary. This arrangement doubles the number of shifting stages of the main gear drive, since the ratio steps of this drive are split.

The input shaft of the transmission, which itself extends into the auxiliary gear drive designed as a splitter drive, carries a first gear freely rotatable opposite to the input shaft, which meshes with a gear of the countershaft of the principal drive. The input shaft carries a shifting apparatus, on its axial end proximal to the main drive, which makes it possible to connect, for torque transfer, the input shaft either non-rotatably with the said loosely rotating gear or with a freely rotatable gear placed on the main shaft of the main transmission. The first gear pairing with the loose gear on the input shaft and the gear which meshes therewith on the countershaft is also designated as the first constant gear, while the second gear pairing, comprised of the first loose gear placed on the main shaft and the gear on the countershaft meshing therewith is designated as the second constant gear. With the aid of the shifting apparatus, either the first constant gear or the second constant gear is brought into the torque transfer.

From DE 196 33, 279 A1, the bearing support of the gear of the second constant, in a transmission with load distribution to two counter shafts has been made known to the Applicant. In this case, the gear was supported by floating radially on a disk which is placed between two axially effective roller bearings. Additionally, a further axially effective roller bearing is provided between the input and the main shafts of the transmission.

The resulting bearing support exhibits, however, disadvantages which are to be corrected.

Thus the invention has the purpose of removing the disadvantages of the present application of bearings.

This purpose is achieved by the features of claim 1. Embodiments are the objects of the subordinate claims.

The existing problem solution in accord with the state of the technology, calls for gears being placed in the area between the input shaft of a transmission and the main shaft and radially supported by bearings either on the input shaft or on the main shaft. Contrary to this, in accord with the invention, the proposal is that, in the case of a vehicle transmission having two countershafts placed in its housing for the purpose of load apportionment, wherein one input shaft and one main shaft are arranged coaxially to the input shaft, and with a gear in the zone between the input shaft and the main shaft, the said gear is to be supported axially by a bearing between the input and main shafts and supported radially, by a bearing exclusively between gears of the two counter shafts.

In an advantageous embodiment of the present invention, the bearing system presents exclusively an axial bearing between the input shaft and the main shaft. In a further advantageous embodiment, the axial bearing comprises two axially acting roller bearings which lie on both sides of a projection of the gear. Yet a further advantageous formulation shows the gear as provided for the reception of the axial forces resulting from the toothing of the main shaft and for conducting the axial forces to the input shaft and to the housing.

Because of the invented arrangement, only two bearings are now necessary instead of the previous three axial bearings. In relation to the design of the teeth and the collective load, the demands on the bearings will change and therewith, also their operational life. If the expected wear on the bearings becomes less, then recourse may be made to the designing of smaller sized bearings.

By means of the removal of the radial bearing of the gear on the main shaft, it is no longer necessary to so dimension this so that it extends axially into the zone between the input shaft and the main shaft. By this means, a savings in material in the area of the main shaft can be undertaken.

The invention will, in the following, be more closely described with the aid of the drawing.

The single figure shows a section of a vehicle transmission 2, having an input shaft 4, which is seated in a transmission housing 8 by bearing 6. On the input shaft 4 is the gear 10 of the first constant rotatably supported by bearings, and by means of a synchronizer apparatus 12, can be non-rotatably affixed to the input shaft 4. A disk 14 is provided radially within the input shaft 4 from which extends a tube 16 for lubrication supply to an opening 18 within a main shaft 20 of the transmission 2. A synchronizing apparatus 22 is placed on the main shaft 20, by which the gear 24 of the second constant can bind mesh the main shaft in a non-rotatable manner. The gear 24 is provided freely rotatable between the input shaft 4 and the main shaft 20 where it is supported by two axially effective roller bearings 26 and 28.

The axial forces generated by helical toothing of the gears (not shown) which are on the main shaft, are first transferred from the main shaft 20 to the roller bearing 26 and to the projection 30 on the gear 24. The roller bearing 28 then transfers the axial forces to the input shaft 4 and, by means of the bearings 6, further to the transmission housing 8.

By means of the synchronization apparatus 12, the gear 24, for the formation of the second constant can be non-rotatingly affixed to the input shaft 4. A direct torque connection between the input shaft 4 and the main shaft 20 for the formation of a direct drive, is likewise effected by means of the gear 24. For that purpose, the synchronizer apparatus 12 is so shifted, here in the plane of the drawing, to the right so that the input shaft 4 is non-rotationally affixed to the gear 24. Additionally, the synchronization apparatus 22 is so displaced, here in the plane of the drawing, to the left so that the main shaft 20 likewise is non-rotatingly affixed to the gear 24.

The bearing of the gear 24 functions in the axial direction by means of the two roller bearings 26 and 28, between the input shaft 4 and the main shaft 20. A radial bearing arrangement for the gear 24 either on the input shaft 4 or on the main shaft 20 is not done. The gear 24 also can make no floating radial bearing on either of the two shafts 4 or 20.

Reference numbers 2 general indication of a transmission
4 input shaft
6 roller bearings
8 transmission housing
10 gear
12 synchronization apparatus
14 disk
16 oil tube
18 opening
20 main shaft
22 synchronization apparatus
24 gear 26 roller bearing
28 roller bearing
30 insert

What is claimed is:

1. A vehicle transmission (2) comprising:

first and second counter shafts for power splitting disposed in a transmission housing (8);

an input shaft (4);

a main shaft (20) disposed coaxially with the input shaft (4); and a gear wheel (24) mounted, via an axial bearing arrangement (26, 28), coaxially between the input shaft (4) and the main shaft (20), wherein the gear wheel (24) is supported exclusively between the main shaft (4) and the input shaft (20) by the axial bearing arrangement (26, 28) located therebetween and the gear wheel (24) and the axial bearing arrangement (26, 28) space the main shaft (4) from the input shaft (20) without the main shaft stand the (4) and the input shaft (20) overlapping one another.

2. The vehicle transmission (2) according to claim 1, wherein the axial bearing arrangement (26, 28) comprises a first and second axial roller bearings (26, 28) which contact a respective first and second sides of a pivot (30) of the gear wheel (24).

3. The vehicle transmission (2) according to claim 1, wherein the gear wheel (24) is provided for taking up the axial forces, which insult form the gearing of the main shaft (20), and for transmitting the axial forces to the input shaft (4) and the transmission housing (8).

4. A vehicle transmission (2) comprising:

first and second counter shafts for power splitting disposed in a transmission housing (8);

an input shaft (4);

a main shaft (20) disposed coaxially with the input shaft (4);

a gear wheel (24) mounted via a fist and second axial roller bearings (26, 28) located coaxially between the input shaft (4) and the main shaft (20);

wherein the gear wheel (24) is exclusively supported by first and second axial roller bearings (26, 28) located between the input shaft (4) and the main shaft (20); and the second axial roller bearing (26, 28) is sandwiched directly between the input shaft (4) and a first side of a projection (30) of the gear wheel (24), and the first axial roller bearing (26) is sandwiched directly between an opposing second side of the projection (30) of the gear wheel (24) and the main shaft (20) for taking up the axial force, which results from gearing of the main shaft (20) and directly transmitting the axial forces through the input shaft (4) to the transmission housing (8).

5. A vehicle transmission (2) comprising:

first and second counter shafts for power splitting disposed in a transmission housing (8);

an input shaft (4) at least partially disposed within the transmission housing (8);

a main shaft (20) at least partially disposed within the transmission housing (8), the main shaft (20) being disposed coaxially with the input shaft (4) and having helical gearing imparting an axial force; and a gear wheel (24) mounted directly between the input shaft (4) and the main shaft (20) solely by an axial bearing arrangement (26, 28) comprising a pair of bearings, the gear wheel (24) and the pair of bearings (26, 28) spacing the main shaft (4) from the input shaft (20) and facilitating a take up axial force imparted by the helical gearing of the main shaft (20) and directly transmitting the axial forces through the input shaft (4) to the transmission housing (8).

* * * * *